April 16, 1946.　　　W. I. LINLOR　　　2,398,653
MAGNETIC STRUCTURE
Filed Oct. 15, 1942

Inventor:
William I. Linlor,
by Harry E. Dunham
His Attorney.

Patented Apr. 16, 1946

2,398,653

UNITED STATES PATENT OFFICE 2,398,653

MAGNETIC STRUCTURE

William L. Linlor, Schenectady, N. Y., assignor to General Electric Company, a corporation of New York Application October 15, 1942, Serial No. 462,133

9 Claims. (Cl. 175—21)

My invention relates to magnet structures.

It is an object of my invention to provide a new and improved magnetic structure in which leakage flux is reduced to a minimum.

Further objects and advantages of my invention will become apparent as the following description proceeds and the features of novelty which characterize my invention will be pointed out with particularity in the claims annexed to and forming a part of this specification. For a better understanding of my invention reference may be had to the accompanying drawing in which Fig. 1 is a schematic diagram of a magnet structure embodying the principles of my invention and Figs. 2 to 8 inclusive are various embodiments of the principles of the invention disclosed in Fig. 1.

Figure 1:
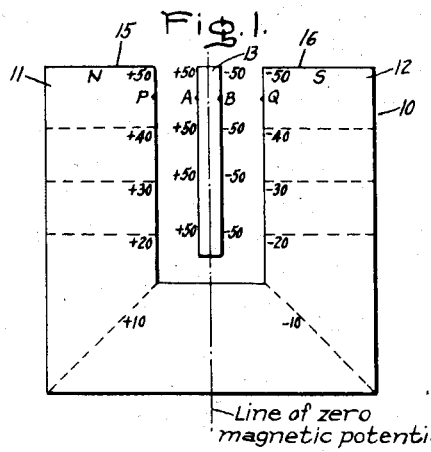

Referring to Fig. 1 of the drawing, there is illustrated a permanent magnet 10 of the horseshoe type having a north or positive leg or pole 11 and a south or negative leg or pole 12. Accordingly, the corresponding points P and Q on the poles 11 and 12, respectively, are at different magnetic potentials. If no midpiece 13 were present the difference of magnetic potential between the points P and Q would cause magnetic flux to go from one point to the other. Similarly at all points along the opposed faces of the poles 11 and 12 there would be a leakage of flux between the poles. The numbers and plus and minus signs shown in Fig. 1 are possible magnetic potential values at the points indicated by the dash lines. The line of zero magnetic potential is shown by a dash-dot line. Of course the maximum positive and negative values will be at the ends of the arms of the magnet 10. If a permanent magnet such as member 13 of magnetic material, magnetized in the direction of its thickness, i. e., in a direction extending between poles, is interposed between the poles of the magnet, it is possible to modify the magnetic potential in such a way that most of the magnetic flux must pass through the pole faces 15 and 16 of the magnet.

If the difference in magnetic potential between the points A and B of the midpiece or flux divertor 13 is just equal and in opposite sense to the difference in magnetic potential between the points P and Q, it will be apparent that no magnetic lines of flux will pass through the midpiece 13 from P to Q. However, if the magnetic potential difference between P and Q is larger than the magnetic potential difference between A and B of the divertor 13, a few magnetic lines of flux pass from P to Q, but much less than would be the case if the midpiece or magnetic insulator 13 were absent. Thus a flux diverter in the arrangement of Fig. 1 is effective to prevent the passage of magnetic lines of flux as long as the magnetic potential difference between the faces of the divertor is greater than or equal to the magnetic potential difference between the corresponding points of the poles 11 and 12 of the magnet 10.

The magnet 10 must provide mmf. and flux to an external path or work circuit of some sort. Therefore, for economic use of space the divertor is preferably thin and therefore it is necessary that the material from which the divertor is made have a relatively high coercive force as compared with the magnet. However, the theory of the mmf. barrier or divertor applies just as well if the material is the same for both magnet and divertor, but if the same material is used for both, the divertor must be almost as thick as the magnet is long in order to have a sufficiently high magnetic potential to counterbalance the magnetic potential of the magnet.

In Fig. 1 there is illustrated an arrangement in which the magnetic potential of the magnetic divertor 13 is uniform along its entire length. Since it is only necessary that at any given point on the magnetic divertor the potential be equal to or greater than the magnetic potential at the corresponding points on the adjacent magnet poles it is not necessary that a uniform potential be applied to the divertor 13. Thus the divertor might have a varying magnetic potential, which may be achieved in ways such as varying its thickness from top to bottom, building the magnetic divertor of uniform thickness but of materials whose coercive forces progressively increase from bottom to top, or subjecting the parts of the divertor to various degrees of magnetization before being placed between the legs 11 and 12 of the magnet 10.

Figure 2:
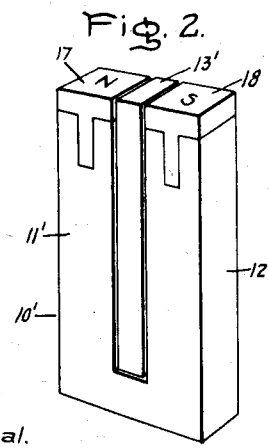

Referring to Fig. 2, there is illustrated a permanent magnet of the horseshoe type as it might appear for practical application. The limbs 11' and 12' of the magnet 10' are brought close to each other, and between the limb areas facing each other is placed the magnetic divertor 13'. The divertor 13' is preferably of relatively high coercive force compared to the limbs 11' and 12' of the magnet 10' and is magnetized in the direction of thickness. This arrangement is advantageous because of the reduction of leakage flux, the strengthening of the magnet poles because less flux is carried by the lower portions of the magnet, and the reduction of the pole-to-pole air gap reluctance by bringing the magnet poles closer together. As previously explained, for best results the magnetic divertor has a magnetic potential at any point along its length of the same sign and magnitude as the magnetic potential of the adjacent parts of the magnet 10'. Pole pieces 17 and 18 of soft iron of high permeability act as flux collectors.

Figure 3:
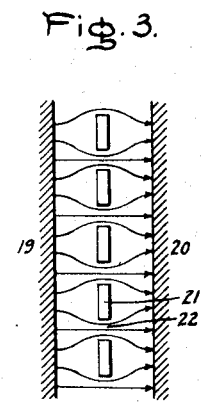

In order to avoid partial demagnetization of the magnetic divertor in cases where the magnetic potential of the divertor is less than the magnetic potential of the magnet at adjacent points, the arrangement of Fig. 3 may be used. This shows two surfaces 19 and 20 of a magnet structure, the poles being of opposite polarity. In this form of my invention the magnetic divertor comprises a row of spaced-apart magnetic divertors 21 extending throughout the space between the poles and magnetized in the direction of thickness. Each such divertor is placed so that its magnetic potential opposes the magnetic potential of surfaces 19 and 20. If it be supposed that the magnetic potential differences of the divertors 21 are equal to or greater than the magnetic potential difference of surfaces 19 and 20, no lines of magnetic flux will pass through the divertors 21, and only a few magnetic lines of flux will pass through the spaces 22 between the divertor segments 21. For values of magnetic potential between poles 19 and 20 greater than the magnetic potential existing across the segment 21, demagnetization of the divertor 21 will not take place because the lines of flux are diverted to the spaces 22 between the divertors. Only slight increases in magnetic lines of flux through the spaces will occur, and since none will pass through the divertors, the grid arrangement of magnetic divertors shown in Fig. 3 provides a relatively high reluctance path for magnetic lines of flux but prevents demagnetization of the divertors thereby extending the range of diversion against the magnetic potential difference existing between the poles 19 and 20.

Figure 4:
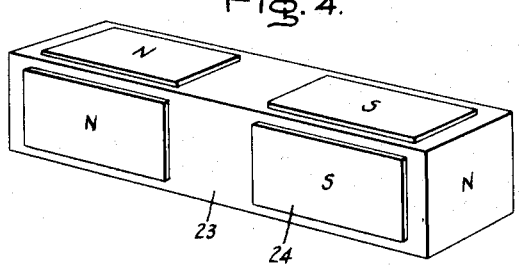

In Fig. 4 there is illustrated a bar magnet 23 to which the principles of my invention have been applied. In this case portions of magnetic material of high coercive force as compared with the material of the magnet 23 are magnetized in the direction of thickness and laid or otherwise disposed adjacent to the magnet 23 so that adjacent parts of the divertors and magnets are of the same polarity. This condition is indicated by the letters N and S in the figure. If the subsidiary thickness-magnetized members 24 are not applied to the primary magnet 23, magnetic lines of flux would move through the air from one pole side of the primary magnet to a similar position of the opposite polarity without opposition. With the flat magnets in place, however, the lines of flux encounter opposing forces and the flux is diverted to portions of the magnet which constitute the working surfaces thereof and therefore the leakage flux of the primary magnet is reduced.

Figure 5:
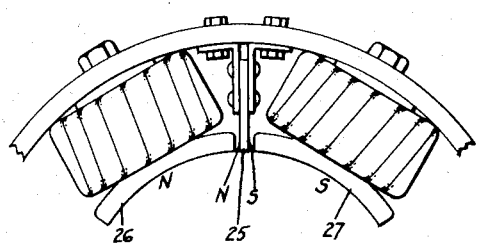

Generally speaking, poles in electrical machines must be separated in order to keep leakage flux low. By the use of my invention, the leakage flux may be reduced by inserting a magnetic divertor 25 between the poles 26 and 27 of an electrical machine as illustrated in Fig. 5. By this means the poles may be brought closer together. For D. C. machines, for example, reduction of leakage flux would result in lower field inductance, lower field $I^2R$ losses and better commutation.

Figure 6:
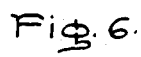

Depending on the flux density distribution desired, magnets may be built of various layers or regions of magnetic materials whose magnetic characteristics differ. For example, for a short magnet which is to be used for lifting, an arrangement as indicated in Fig. 6 may be used. The end of the central magnet 28 which is seen in the drawing is illustrated as a north pole while the exposed end of the outer magnet 29, surrounding the inner magnet, is shown as a south pole. The region between these two parts is filled with magnetic material magnetized in such a direction that adjacent portions of the divertor 30 and the magnets 28 and 29 have like polarity. This arrangement provides an air flux density of high value at both ends of the magnet.

In certain devices such as induction motors, the relative motion of various parts produces eddy currents and consequent torques. At times it is desirable to have as high a value of eddy current torque as possible. The effective relative speed and hence eddy current torques may be increased by the use of appropriately placed magnetic shields as illustrated in schematic fashion in Fig. 7. A D. C. excited rotating pole structure 31 may be provided for sending out magnetic lines of force as indicated by the arrows across a stationary, electrically conducting surface 32 to a flux collecting structure 33 whence they return to the poles of the structure 31 by magnetic end connections, not shown. The structure 33 is arranged to rotate at the same angular velocity as the pole structure 31. Between the electrically conducting surface 32 and the flux collecting structure 33 are interposed spaced-apart magnetic divertors as indicated by the numeral 34. As the pole structure rotates in the clockwise direction, the flux lines begin to pile up at the leading edges of the divertor segments. As rotation of the pole structure increases, the flexed lines become lengthened until finally they snap to a position between the next pair of divertors. During the change of flux from one space to the next space, the effective rate of travel of the flux lines across the electrically conducting surface 32 is very high, thus inducing high eddy currents and hence high torque. A similar arrangement may be used for increasing the starting and breakdown torque of induction motors.

Figure 8:
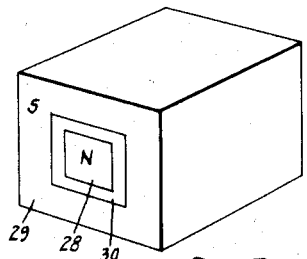
Figure 8:
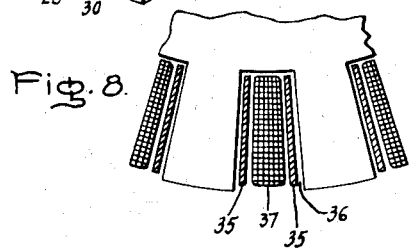
Figure 7:
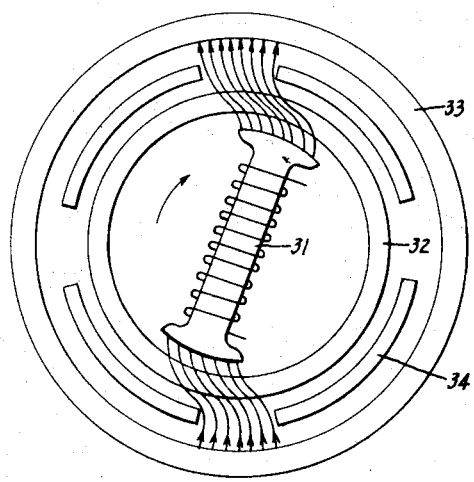

In D. C. motors and generators the leakage flux which occurs in the armature slots as a result of armature current produces undesirable voltages at the brushes during the commutation interval and sparking results. One way of avoiding such slot commutation effect is to eliminate or at least minimize the slot leakage flux. This can be achieved by counterbalancing the magnetomotive force due to the current flowing in the slot conductors by equal and opposite magnetomotive force provided by a magnetic shield of the type described above. Fig. 8 shows a schematic arrangement of an armature arranged for accomplishing this result. There are illustrated two magnetic shields 35 in each armature slot 36 disposed between the armature conductor 37 and sides of the slot, one on each side of the conductor. The surfaces of the shields which are of like polarity should be opposite each other. In other words, the faces of like polarity, as positive, should be next to either the conductor or else the slot wall. Two shields per slot are necessary because the magnetomotive force caused by the current reverses each time the slot passes under a succeeding main pole. One shield bucks the magnetomotive force due to current in one direction while the other shield at that instant is ineffective. After the current reverses the shields interchange functions. Such selective bucking action of the shields tends to prevent slot leakage flux from building up and hence during the commutation interval there is no sudden decay of slot leakage flux and therefore there is substantially no slot commutation sparking.

While I have shown particular embodiments of my invention I do not desire my invention to be limited to the particular constructions shown and described and I intend in the appended claims to cover all modifications within the spirit and scope of my invention.

What I claim as new and desire to secure by Letters Patent of the United States is:

1. A magnetic structure comprising two pole pieces of opposite polarity, means for reducing leakage flux between said pole pieces, said means comprising a permanent magnet in the form of a rectangular parallelepiped positioned between said pole pieces, said permanent magnet and said pole pieces having adjacent juxtaposed surfaces of like polarity.

2. In combination in a magnetic structure, a magnetic circuit comprising a source of magnetic flux, a pair of pole pieces, and means for decreasing the leakage flux between said pole pieces, said means including a permanent magnet positioned between said pole pieces and magnetized in the direction of said leakage flux, said permanent magnet and pole pieces having adjacent juxtaposed surfaces of like polarity.

3. In combination with a magnetic structure comprising adjacent poles of opposite polarity, magnetic means for reducing the leakage flux between said poles, said means being disposed between said poles and being magnetized in the direction of its thickness to a magnetomotive force which is equal to or greater than the pole-to-pole magnetomotive force at corresponding points of the adjacent poles.

4. In combination with a permanent magnet comprising adjacent poles of opposite polarity, magnetic means for reducing the leakage flux between said poles, said means comprising a member formed of magnetic material disposed between said poles and occupying substantially all of the space therebetween, said member being magnetized in the direction of its thickness, said member and said poles having adjacent juxtaposed surfaces of like polarity.

5. In combination with a permanent magnet of the type having poles of opposite polarity spaced closely together, magnetic means for reducing the leakage flux between said poles and increasing the pole face to pole face flux, said means comprising a member formed of magnetic material disposed between said poles and occupying substantially all of the space therebetween, said member being magnetized in the direction of its thickness, said member and said poles having adjacent juxtaposed surfaces of like polarity, the magnetization of said member being such that its magnetomotive force is equal to or greater than the pole-to-pole magnetomotive force at corresponding points of the adjacent poles.

6. In combination with a permanent magnet structure of the type having a pair of spaced apart poles of opposite polarity, means disposed between said poles, said means comprising a plurality of spaced apart segments of magnetic material, each of said segments being magnetized in the direction extending between said poles, said segments and poles having adjacent juxtaposed surfaces of like polarity, the segments being disposed substantially throughout the space between said poles.

7. In combination, a first permanent magnet of the bar type, a second permanent magnet surrounding said first permanent magnet in spaced apart relationship, said magnets being so disposed that opposite poles are adjacent each other, a third permanent magnet disposed in the space between said first and second magnets and magnetized in the direction of its thickness to a magnetomotive force equal to or greater than the pole-to-pole magnetomotive force.

8. In combination, a first permanent magnet of substantially U-shape having a magnet body and pole pieces, said pole pieces forming pole faces of opposite polarity, means comprising a second permanent magnet magnetized in the direction of the leakage flux between said pole pieces and disposed between said pole pieces of said first magnet, the magnetomotive force of said second magnet being equal to or greater than the magnetomotive force between said pole pieces.

9. A magnetic structure comprising two pole pieces and means for controlling the direction of the flux path between said pole pieces and also the density of the flux, said means comprising a permanent magnet positioned between said pole pieces, said permanent magnet and pole pieces having adjacent juxtaposed surfaces of like polarity.

WILLIAM I. LINLOR.